(No Model.)

S. T. WILLIAMS.
WHEEL.

No. 305,771. Patented Sept. 30, 1884.

Witnesses:
Herbert Southwick
E. Kregeloh

Inventor:
Samuel T. Williams
By Ernest C. Webb
his Attorney.

UNITED STATES PATENT OFFICE.

SAMUEL T. WILLIAMS, OF RED BANK, ASSIGNOR TO THE WILLIAMS TENSION WHEEL COMPANY, OF NEWARK, NEW JERSEY.

WHEEL.

SPECIFICATION forming part of Letters Patent No. 305,771, dated September 30, 1884.

Application filed February 14, 1884. (No model.)

*To all whom it may concern:*

Be it known that I, SAMUEL T. WILLIAMS, a citizen of the United States, residing at Red Bank, in the county of Monmouth and State of New Jersey, have invented certain new and useful Improvements in Wheels, of which the following is a full, clear, and exact description.

This invention relates to that class of wheels in which the spokes are of wire, and are adapted to be stiffened by tension applied to them.

The invention consists in means for applying tension to such wire-spoked wheels, substantially as hereinafter specified and claimed.

Figure 1:
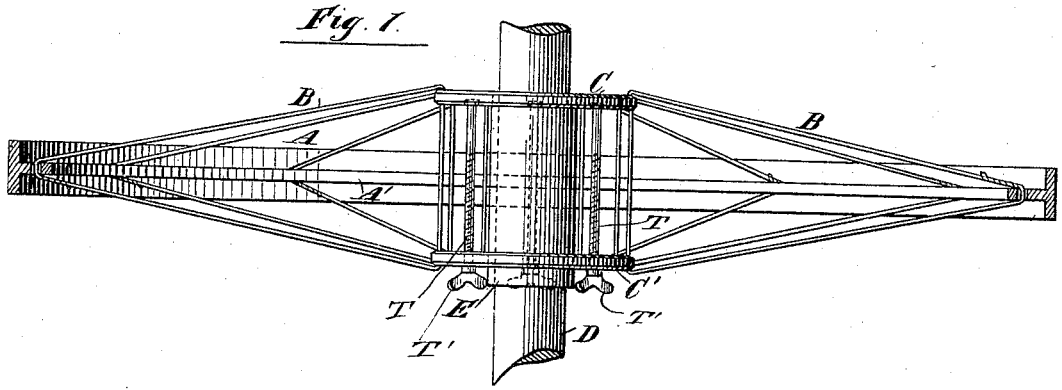
Figure 2:
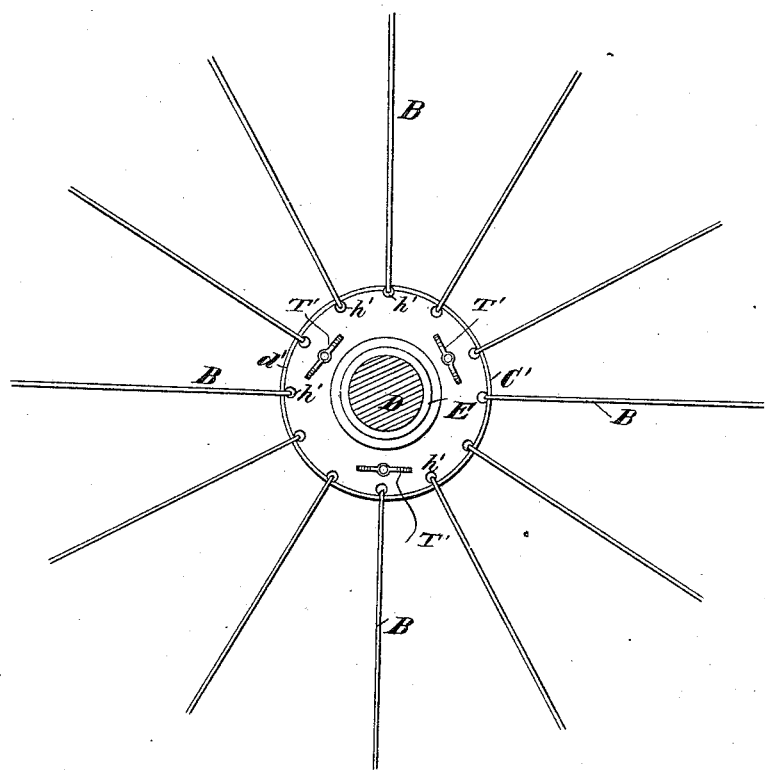

In the accompanying drawings, in the two figures of which similar letters of reference indicate like parts, Figure 1 is a horizontal cross-section of the rim and a plan view of the hub of a wheel constructed in accordance with my present improvement; and Fig. 2, a side elevation thereof, the rim being removed.

The wheel, as in the parent invention shown in my application No. 83,695, filed February 1, 1883, has a T-shaped rim, A A', wire spokes B, and a hub composed of parallel halves C C', one of which is adapted to be moved toward or from the other. The spokes are wire loops passed through the halves of the hub, and secured to the flange or felly of the rim. In this invention the halves C C' of the hub are disks fixed against rotation, but one of which is adapted to slide on a sleeve, E, rotating on or with the axle D. Near the rims $d'$ of these disks are holes $h'$, through which the looped wire spokes are passed, and then their ends passed through holes in the rim-flange and securely bound together. The hub-halves C C' are connected by a number of screws or screw-bolts, T, having handle-heads or thumb-pieces T', and disposed with respect to the halves to obtain the necessary leverage. These screws are swiveled in one of the hub-halves, and engage screw-threaded holes in the other half, so that by rotating them the movable hub-half may be caused to approach to or recede from the other to vary their distance apart, and consequently diminish or increase the tension on the spokes, by distending said spoke-loops less or more by the proximity of the said halves carrying them. Increasing the tension on the spokes of course increases the stiffness and augments the stability of the wheel.

What I claim as my invention, and desire to secure by Letters Patent, is—

The combination, with the rim and sleeve E and the fixed disk and movable disk having holes $h'$, of the wires or spokes B, made as loops, each passed through opposite aligned holes in the two disks and then secured to the rim, and the screws T, for varying the proximity of the disks to vary the tension of the spokes, substantially as shown and described.

In testimony whereof I have hereunto set my hand this 9th day of February, A. D. 1884.

SAMUEL T. WILLIAMS.

Witnesses:
 ARTHUR C. WEBB,
 ERNEST C. WEBB.